(12) United States Patent
Reif et al.

(10) Patent No.: US 8,453,847 B2
(45) Date of Patent: Jun. 4, 2013

(54) FILTER CARTRIDGE UNIT WITH ADHESIVE INTERCONNECTING FILTER CARTRIDGE AND END PLATES

(75) Inventors: Oscar-Werner Reif, Hannover (DE); Ulrich Grummert, Bad Sooden-Allendorf (DE); Frank Oppermann, Goettingen (DE)

(73) Assignee: Sartorius Stedim Biotech GmbH, Goettingen (DE)

( * ) Notice: Subject to any disclaimer, the term of this patent is extended or adjusted under 35 U.S.C. 154(b) by 319 days.

(21) Appl. No.: 12/625,376

(22) Filed: Nov. 24, 2009

(65) Prior Publication Data
US 2010/0072125 A1 Mar. 25, 2010

Related U.S. Application Data

(63) Continuation of application No. PCT/EP2008/003493, filed on Apr. 30, 2008.

(30) Foreign Application Priority Data

May 31, 2007 (DE) .................. 10 2007 025 541

(51) Int. Cl.
| | |
|---|---|
| B01D 27/00 | (2006.01) |
| B01D 35/00 | (2006.01) |
| B01D 35/30 | (2006.01) |
| B01D 27/08 | (2006.01) |
| B01D 63/00 | (2006.01) |

(52) U.S. Cl.
USPC .......... 210/455; 210/321.61; 210/321.72; 210/443; 210/450; 210/454; 210/483; 210/484; 210/488; 210/493.2

(58) Field of Classification Search
USPC .................. 210/450, 455, 484, 454, 488
See application file for complete search history.

(56) References Cited

U.S. PATENT DOCUMENTS

| | | | | |
|---|---|---|---|---|
| 3,494,466 | A | * | 2/1970 | Cub Fritz et al. ............ 210/232 |
| 3,864,265 | A | * | 2/1975 | Markley ................... 210/321.77 |
| 3,880,627 | A | * | 4/1975 | Morton ........................... 55/499 |
| 4,849,102 | A | | 7/1989 | Latour et al. |
| 4,882,050 | A | | 11/1989 | Kopf |
| 5,429,742 | A | | 7/1995 | Gutman et al. |
| 5,575,910 | A | | 11/1996 | Karbachsch et al. |
| 6,929,743 | B2 | | 8/2005 | Diel |
| 2001/0027941 | A1 | * | 10/2001 | Assmann ..................... 210/130 |
| 2005/0193695 | A1 | * | 9/2005 | Holmes et al. ................ 55/482 |
| 2010/0065481 | A1 | * | 3/2010 | Formica ...................... 210/133 |

FOREIGN PATENT DOCUMENTS

| | | | |
|---|---|---|---|
| DE | 6801138 | * | 3/1969 |
| DE | 3127548 A1 | | 4/1982 |
| DE | 3441249 A1 | | 5/1985 |
| DE | 4432627 A1 | | 3/1996 |
| DE | 10000186 A1 | | 8/2001 |
| GB | 1224887 | | 3/1971 |
| GB | 2080144 A | | 2/1982 |

\* cited by examiner

Primary Examiner — Benjamin Kurtz
(74) Attorney, Agent, or Firm — Sughrue Mion, PLLC

(57) ABSTRACT

A filter cartridge unit including a first end plate, at least one second end plate, and a filter cartridge that is arranged between the end plates. The filter cartridge is connected, in a form-fitting and fluid-tight manner, to its adjacent end plates in a circumferential subarea of contact surfaces thereof using an adhesive.

8 Claims, 6 Drawing Sheets

FILTER CARTRIDGE UNIT WITH ADHESIVE INTERCONNECTING FILTER CARTRIDGE AND END PLATES

This is a Continuation of International Application PCT/EP2008/003493, with an international filing date of Apr. 30, 2008, which was published under PCT Article 21(2) in German, and the complete disclosure of which is incorporated into this application by reference.

FIELD AND BACKGROUND OF THE INVENTION

The invention relates to a filter cartridge unit comprising a first end plate, at least one second end plate, and a filter cartridge which is arranged between the end plates.

Filter cartridge units are used, for example, in the ultrafiltration and microfiltration of liquids. Filter cartridges or membrane cartridges are usually positioned adjacent to a distribution plate and are clamped and pressed together with the aid of a filter holder between two clamping plates or end plates. The distribution plate has connectors for the medium to be filtered and connectors for the filtrate or permeate and, in the case of cross-flow filtration, connectors for the retentate or concentrate. In order to connect to the filter cartridges which are engagable or stackable one after another, the distribution plate has channels in the interior thereof which are connected to the connectors.

Filter cartridge units of this type are known, for example, from DE 34 41 249 C2, DE 44 32 627 A1 or DE 100 00 186 C2.

A disadvantage of the known filter units that have become well established is that, following use, the filter cartridge unit has to be disassembled and the filter cartridge must be removed. This can result in undesirable contamination of the end plates, the distribution plates or other parts of the surroundings.

A further disadvantage of the known filter units configured as multi-use devices is that complex cleaning and validation steps are needed to preclude cross-contamination if the user filters different media successively with one filter unit.

U.S. Pat. No. 5,429,742 discloses generally that filter cartridges can be glued to the end plates. However, U.S. Pat. No. 5,429,742 does not disclose more detail concerning the glued connection.

It is known from DE 68 01 138 U to stack filters or membranes and to hold the stack together with end plates. For this purpose, the membranes, the plates arranged between the membranes and the end plates have holes which form channels due to the stacking and which can be filled with a curable plastics adhesive.

U.S. Pat. No. 4,882,050 discloses filter plates which are also layered on one another and are clamped together via end plates. It is known, for correctly placed assembly, either to mold projecting elements, which engage in corresponding recesses of the filter plates, onto the end plates or to fasten these projections on by gluing.

In addition, DE 31 27 548 C2 discloses a filter cartridge unit wherein support plates and membrane filters stacked over one another have perforations in the stacking direction that can be filled with adhesive or synthetic resin. The end plates are clamped to one another by means of clamping elements guided by bolt bores.

U.S. Pat. No. 4,849,102 describes a filter cartridge unit with a distribution plate arranged between two filter cartridges, wherein the filter cartridges are clamped between two end plates.

OBJECTS AND SUMMARY OF THE INVENTION

It is an object of the present invention to improve the known filter cartridge units such that easy, contamination-free handling is ensured. A related object is to achieve a reliable, fluid-tight connection between the end plates and the filter cartridge.

According to one formulation of the invention, a filter cartridge is connected in a positive (e.g. form-fitting) and fluid-tight manner to adjacent end plates of the cartridge in a circumferential subarea of the contact surfaces of the cartridge with an adhesive. The end plates have anchoring grooves in a subarea corresponding to the circumferential subarea and/or have an undercut slot which is filled with the adhesive connected to the filter cartridge.

Due to the grooves or the undercut of the slot, a reliable, positive and fluid-tight connection is achieved between the end plates and the filter cartridge after curing. The positive and fluid-tight connection of the filter cartridge to its adjacent end plates does not require complex assembly or disassembly and avoids the contamination of the surroundings that is associated particularly with disassembly. At the same time, it is possible to produce the filter cartridge unit so economically that it is suitable for one-time (e.g. disposable) use. The filter cartridge unit can be preserved as a unit or packaged sterile and ready for use.

According to a preferred embodiment of the invention, the adhesive is made from the casting material of the filter cartridge. This achieves a firm and secure bond with the casting compound which surrounds the filter cartridge laterally and on the edge of the contact surfaces in overlapping manner in the circumferential subarea.

According to another preferred embodiment of the invention, a further end plate is arranged between the first filter cartridge and a second filter cartridge. The end plate arranged between the two filter cartridges can have perforations in the subareas corresponding to the circumferential subareas of the filter cartridges, through which the adhesive connects the filter cartridges to one another.

The filter cartridges include at least one filter element. Preferably, a plurality of filter elements are stacked on one another and are provided with channels, such that the filter cartridges constitute dead-end filter cartridges or cross-flow filter cartridges, in known manner.

According to a further preferred embodiment of the invention, the filter cartridge unit is made essentially exclusively from organic polymer materials.

Configuring the unit completely from organic polymer materials simplifies handling of the filter cartridge unit both in use and during disposal.

According to a further preferred embodiment of the invention, at least one of the end plates is configured as a distribution plate and includes channels and flow openings that supply the fluid to be filtered and that conduct away the concentrate and filtrate (in the case of cross-flow filtration) or openings for the fluid to be filtered and for the filtrate or permeate (in the case of dead-end filtration). For easier handling, the distribution plate is preferably equipped with fluid connection adaptors.

According to a further preferred embodiment of the invention, the filter cartridge unit is enclosed by a gas-tight and fluid-tight packaging, wherein the filter cartridge unit has been sterilized in the packaging via a separable gas-permeable window, for example, with steam or ethylene oxide. This enables sterile storage and safe handling of the filter cartridge unit. A gas-tight and fluid-tight film bag having a window made from Tyvek® from DuPont, which is permeable, for example, to superheated steam is suitable as the packaging. Following sterilization, the film bag is provided with a weld seam between the filter unit and the Tyvek® window, thus preventing undesirable drying out of the filter unit. The region with the Tyvek window can be separated from the remainder of the bag, for example, following steam sterilization.

According to a particularly preferred embodiment, the inventive filter cartridge unit is usable for filtration without the need for clamping in a filter holder or in clamping plates. With suitable selection of the casting compound which surrounds the filter cartridge laterally and on the edge of the contact surfaces in overlapping manner in the circumferential subarea of the end plates or distribution plates, not only can a fluid-tight connection be made between the filter cartridge and the end plates or distribution plates. Additionally, by introducing the casting compound into a pretensioned filter cartridge unit, the device can be operated without the need for any of the otherwise conventional clamping plates.

Further details are disclosed in the detailed description below and the accompanying drawings in which currently preferred embodiments of the invention are illustrated by way of example.

DETAILED DESCRIPTION OF THE PREFERRED EMBODIMENTS

A filter cartridge unit 1 includes a filter cartridge 2 and end plates 3, 4 adjoining the filter cartridge 2.

Figure 1:
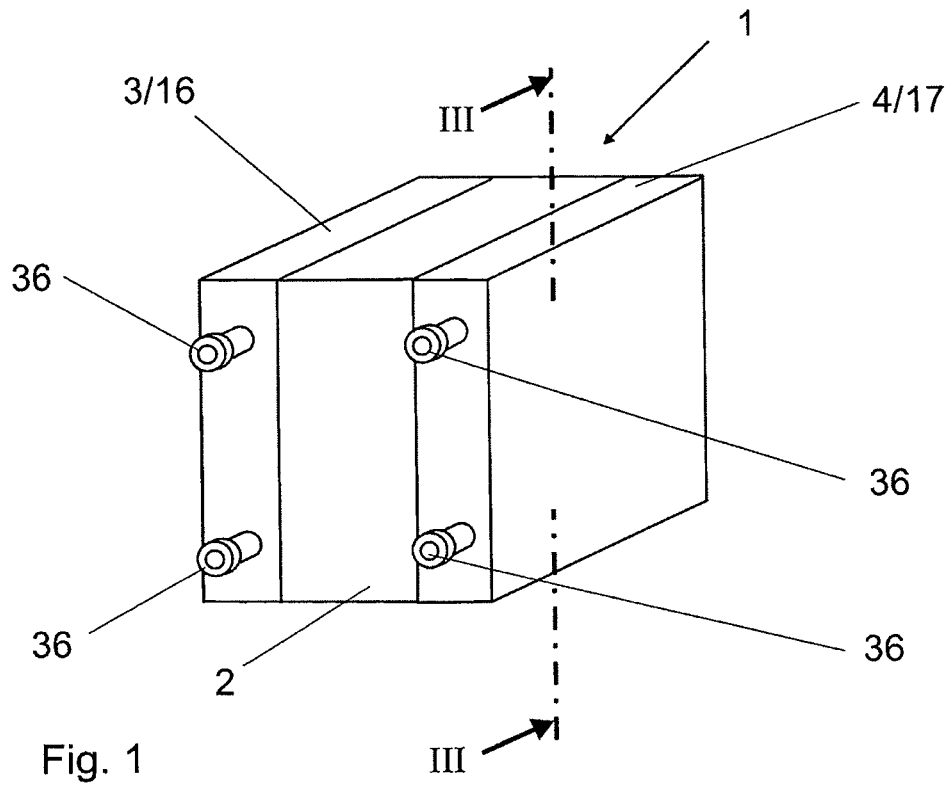
FIG. 1 is a perspective view of a filter cartridge unit.
Figure 5:
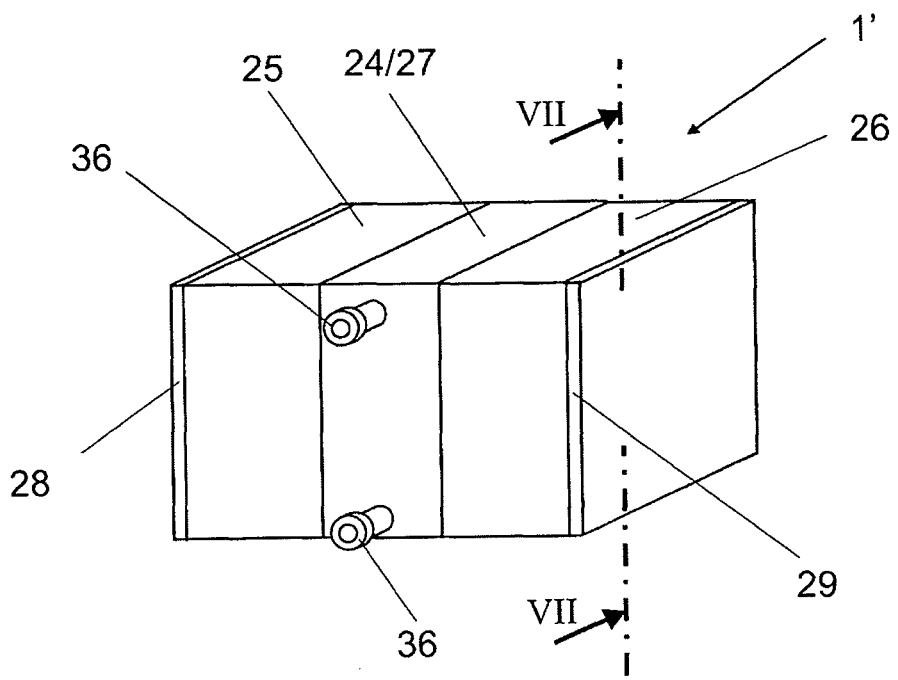
FIG. 5 is a perspective view of a further filter cartridge unit with a distribution plate arranged between two filter cartridges.
Figure 6:
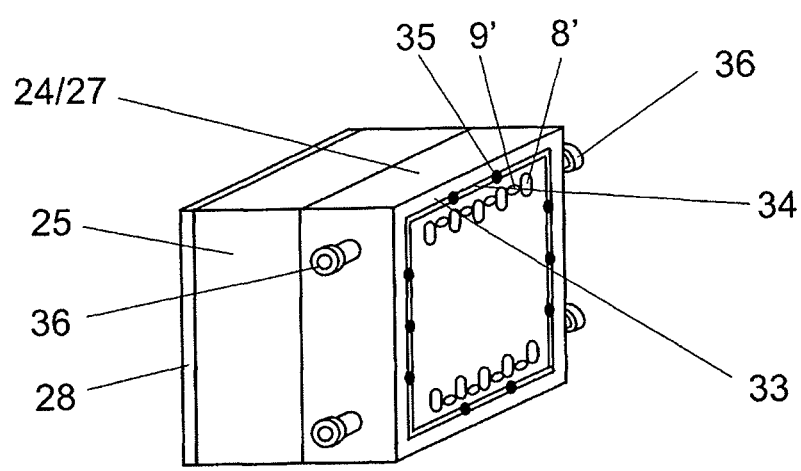
FIG. 6 is a perspective view of the filter cartridge unit of FIG. 5 without the second filter cartridge.
Figure 10:
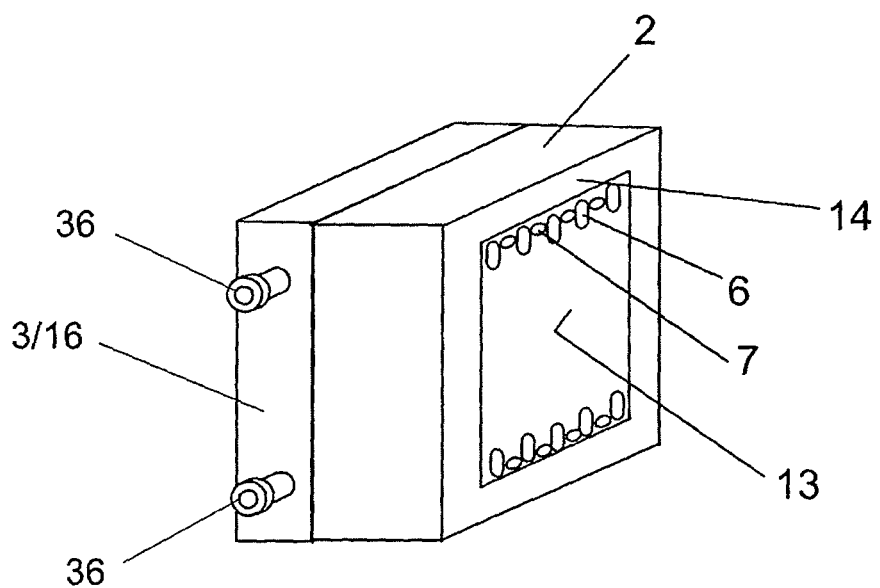
FIG. 10 is a perspective view of the first end plate with the filter cartridge of the filter cartridge unit of FIG. 1.
Figure 11:
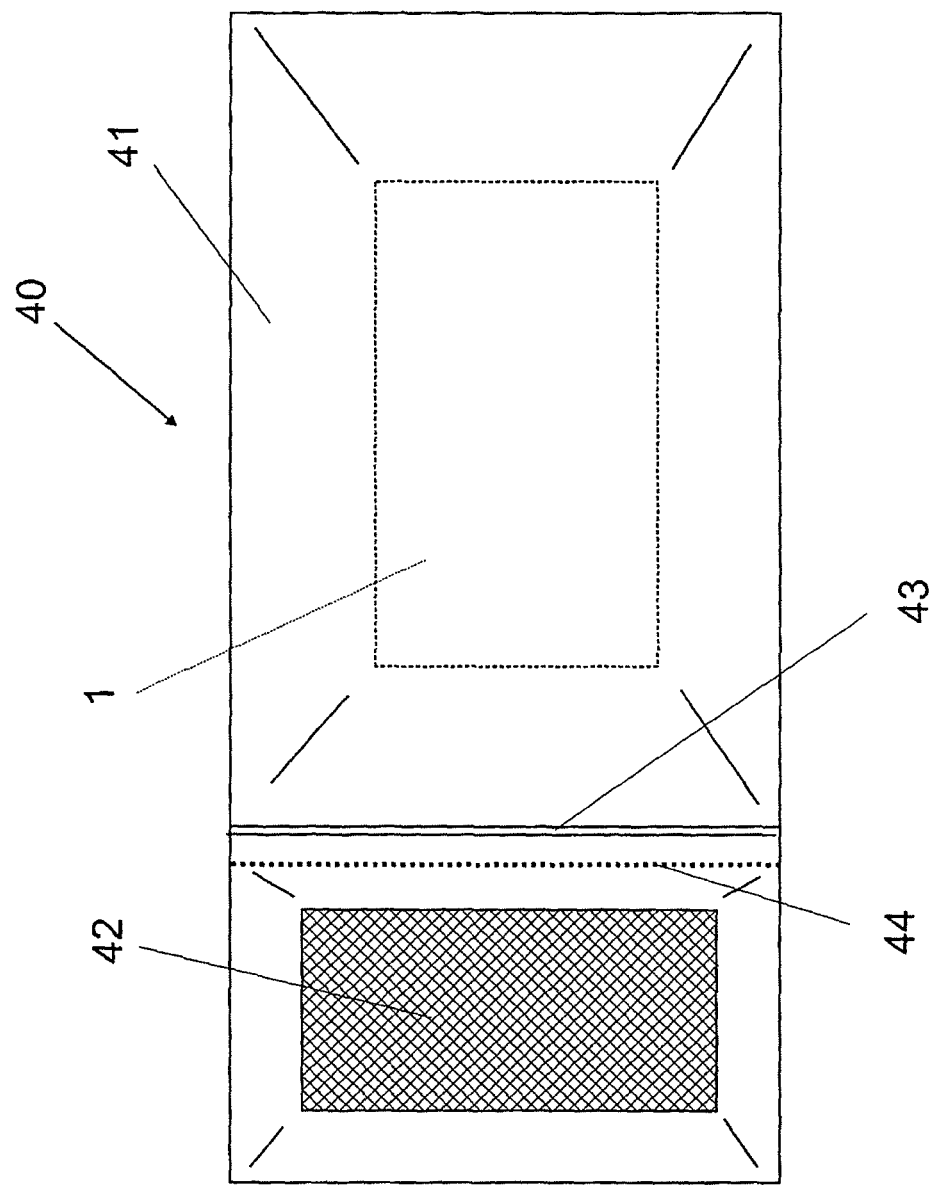
FIG. 11 is a diminished plan view of a package configured as a film bag with the filter cartridge unit indicated by dotted lines.

The filter cartridge 2, which may be of conventional design, has a plurality of filter elements 5 stacked on one another, having, in the example shown (see FIG. 10), flow openings 6, 7 at their opposing longitudinal edges, said flow openings corresponding with flow openings 8, 9 in the end plates 3, 4. The filter cartridges 2 of the exemplary embodiments of FIG. 1 and FIG. 5 are configured, in known manner, as cross-flow filter cartridges. The filter cartridge 2 has a casting compound 10 poured thereinto at the side edges thereof, overlapping the edges of the contact surfaces 12, 13 facing the end plates 3, 4 in a circumferential subarea 14, 15 (see e.g. perimeters 14 and 15 in FIG. 3 and perimeter 14 in FIG. 10).

Figure 2:
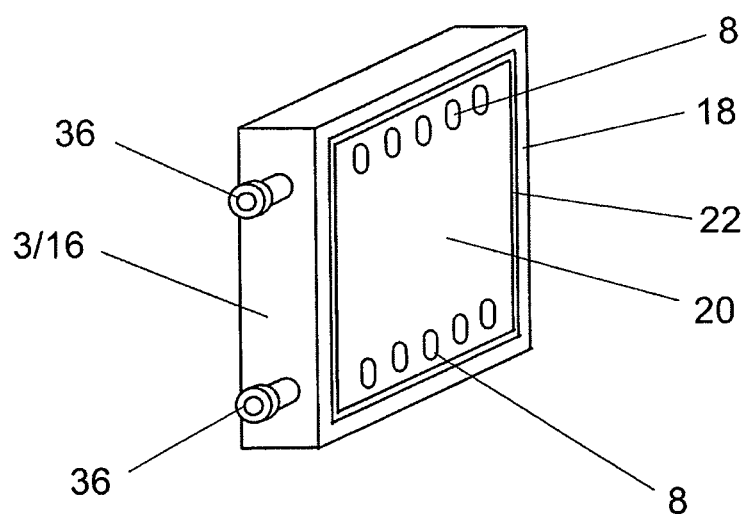
FIG. 2 is a perspective view of the first end plate of FIG. 1 configured as a distribution plate.
Figure 3:
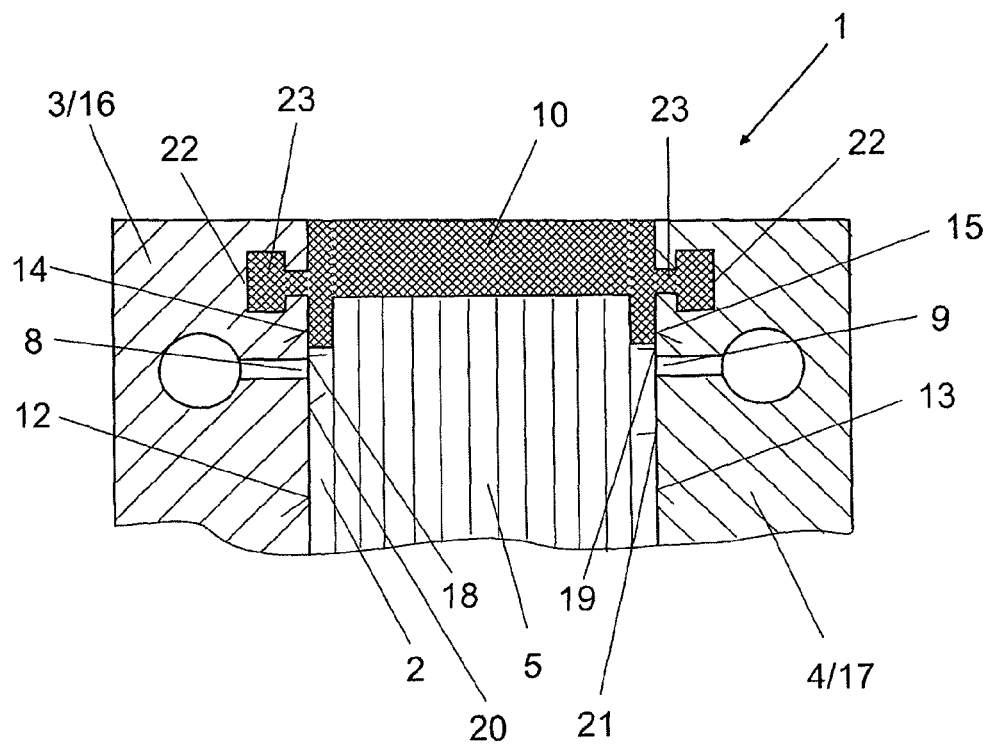
FIG. 3 is an enlarged view of the filter cartridge unit of FIG. 1 in section along the line III-III.
Figure 4:
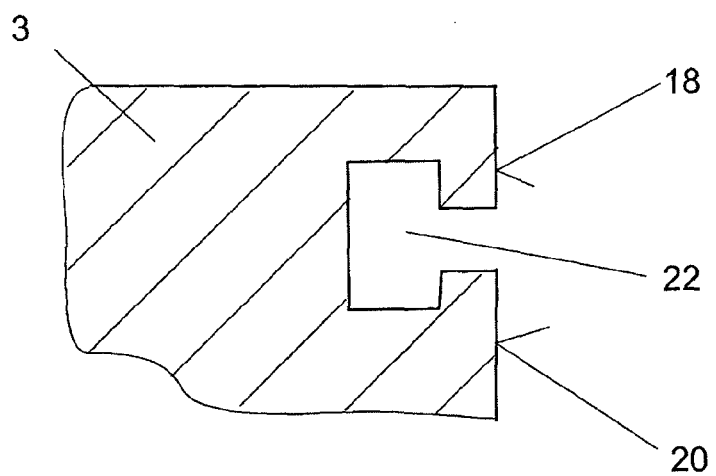
FIG. 4 is an enlarged view of the first end plate of FIG. 3 in section.

In the exemplary embodiment of FIGS. 1 to 3, the end plates 3, 4 are configured as distribution plates 16, 17. Via the first distribution plate 16 which constitutes the first end plate 3, the collected retentate is conducted away, while via the second distribution plate 17 which constitutes the second end plate 4, the permeate or filtrate is conducted away.

In a subarea 18, 19 of the end plates 3, 4 corresponding to the circumferential subarea 14, 15 of the contact surfaces 12, 13, the end plates 3, 4 have on the contact surfaces 20, 21 thereof an undercut slot 22. This slot 22, is, for example, T-shaped. The undercut slot 22 is filled with adhesive 23, which is connected to the casting compound 10 in the circumferential subarea 14, 15 of the contact surfaces 12, 13. In the example shown here, the adhesive 23 consists of the casting compound 10 of the filter cartridge 2.

The exemplary embodiment of FIGS. 5 to 8 shows a filter cartridge unit 1', which comprises a third end plate 24 between a first filter cartridge 25 and a second filter cartridge 26.

The third end plate 24 constitutes a common end plate for the two adjacent filter cartridges 25, 26 and is configured as a distribution plate 27. The two outwardly situated end plates 28, 29 are configured as cover plates which have no channels. They can be held suitably flat and can be configured, for example, as film.

Figure 7:
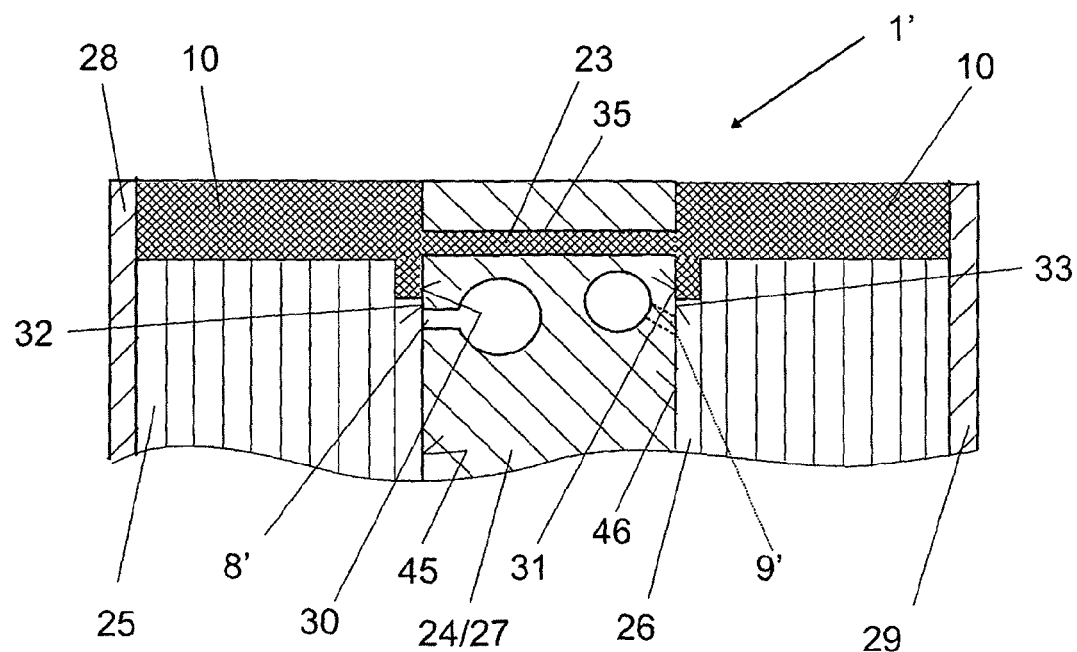
FIG. 7 is the filter cartridge unit of FIG. 5 in an enlarged view, in section along the line VII-VII.
Figure 8:
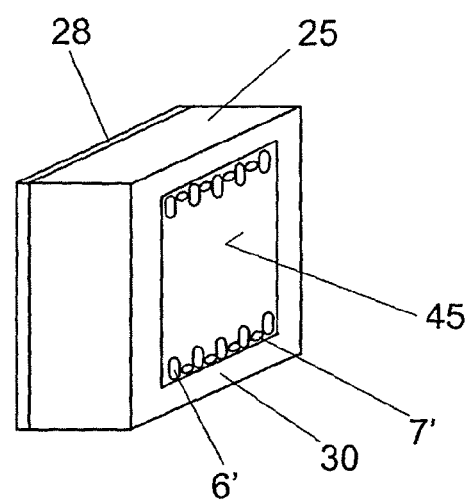
FIG. 8 is a perspective view of the first filter cartridge of the filter cartridge unit of FIG. 5.
Figure 9:
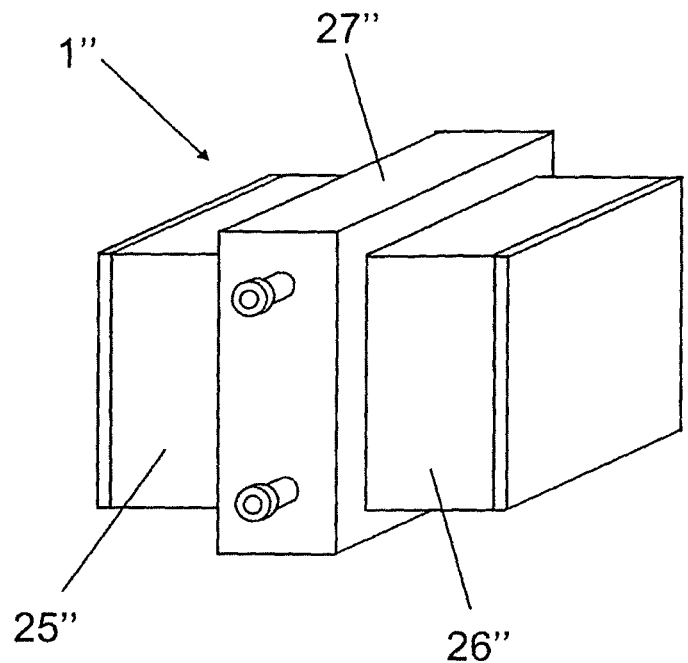
FIG. 9 is a perspective view of a further filter cartridge unit with a distribution plate arranged between two filter cartridges.

According to the exemplary embodiment of FIG. 7, the distribution plate 27 has a circumferential undercut slot 34 (see FIG. 6) in the subareas 32, 33, which correspond to the circumferential subareas 30, 31 of the contact surfaces 45, 46 of the filter cartridges 25, 26. The third end plate 24, configured as the distribution plate 27, has perforations 35 in the circumferential subareas 30, 31 via which the adhesive 23 connects the filter cartridges to one another. FIG. 9 shows a filter cartridge unit 1" which essentially corresponds to the exemplary embodiment of FIG. 5. The distribution plate 27" projects in known manner beyond the filter cartridges 25", 26". However, it is advantageous to have the distribution plate configured to have the same circumference as the filter cartridges 25", 26".

The distribution plates 16, 17, 27, 27" are equipped with fluid connector adaptors 36.

The filter cartridge unit 1, 1', 1" can be stored in a gas-tight and fluid-tight packaging 40. The filter cartridge unit 1, 1', 1" is introduced into the packaging 40, which is configured as a film bag 41, and welded at the outer edges. The film bag 41 has a window 42, made from Tyvek® from DuPont, to the interior thereof. This window 42 makes it possible for the filter cartridge unit 1, 1', 1" to be autoclaved in the film bag 41, that is, sterilized with superheated steam. In order to prevent subsequent drying out of the filter cartridge unit or of the filter cartridges 2, 25, 26, a weld seam 43 is placed between the window 42 and the filter cartridge unit 1, 1', 1". This weld seam seals the interior of the bag surrounding the filter cartridge unit relative to the window 42. The portion of the film bag which has the window 42 and which is no longer needed can be separated along a separating line 44.

The above description of the preferred embodiments has been given by way of example. From the disclosure given, those skilled in the art will not only understand the present invention and its attendant advantages, but will also find apparent various changes and modifications to the structures disclosed. The applicant seeks, therefore, to cover all such changes and modifications as fall within the spirit and scope of the invention, as defined by the appended claims, and equivalents thereof.

What is claimed is:

1. A filter cartridge unit comprising:
   a first end plate and at least one second end plate, and
   a filter cartridge arranged between the end plates,
   wherein at least one of the first end plate and the second end plate comprises first flow openings,
   wherein the filter cartridge comprises second flow openings which correspond to the first flow openings,
   wherein an adhesive forms side edges of the filter cartridge which are not surrounded by the at least one of the first end plate and the second end plate,
   wherein the filter cartridge is fluid-tightly connected in a form-fitting manner to the end plates that are adjacent to and spaced apart by the filter cartridge with the adhesive in an entire circumferential subarea of contact surfaces of the filter cartridge that connect the filter cartridge with the adjacent end plates, and
   wherein the end plates comprise at least one of anchoring grooves in a subarea corresponding to the circumferential subarea, and an undercut slot, which is filled with the adhesive connected to the filter cartridge.

2. The filter cartridge unit as claimed in claim 1, wherein the adhesive comprises casting compound of the filter cartridge.

3. The filter cartridge unit as claimed in claim 1, wherein the filter cartridge comprises at least one filter element.

4. The filter cartridge unit as claimed in claim 1, wherein the filter cartridge is configured as a cross-flow filter cartridge or a dead-end filter cartridge.

5. The filter cartridge unit as claimed in claim 1, wherein the filter cartridge unit consists essentially of at least one organic polymer material.

6. The filter cartridge unit as claimed in claim 1, wherein at least one of the end plates is configured as a distribution plate and comprises channels configured to feed in fluid to be filtered and to conduct away filtrate.

7. The filter cartridge unit as claimed in claim 6, wherein the distribution plate is equipped with fluid connection adaptors.

8. The filter cartridge unit as claimed in claim 1, wherein the filter cartridge unit is sterilized and enclosed by a gas-tight and fluid-tight packaging.

* * * * *